(12) United States Patent
Kumagai et al.

(10) Patent No.: US 7,409,553 B2
(45) Date of Patent: Aug. 5, 2008

(54) PUBLIC KEY CERTIFICATE GENERATION METHOD, VALIDATION METHOD AND APPARATUS THEREOF

(75) Inventors: Yoko Kumagai, Kawasaki (JP); Takahiro Fujishiro, Yokohama (JP); Satoru Tezuka, Yokohama (JP); Takanobu Oikawa, Funabashi (JP); Izumi Anayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 816 days.

(21) Appl. No.: 10/076,624

(22) Filed: Feb. 19, 2002

(65) Prior Publication Data

US 2003/0097566 A1    May 22, 2003

(30) Foreign Application Priority Data

Nov. 22, 2001 (JP) .............................. 2001-356851

(51) Int. Cl.
*H04L 9/00* (2006.01)
*H04K 1/00* (2006.01)
*H04L 9/30* (2006.01)

(52) U.S. Cl. .................... 713/175; 713/155; 713/156; 713/157; 713/158; 380/30; 380/285; 705/44; 705/50; 705/75; 705/76

(58) Field of Classification Search ................ 713/200, 713/175, 155–158; 380/30, 285; 705/44, 705/50, 75–76
See application file for complete search history.

(56) References Cited

U.S. PATENT DOCUMENTS

| | | | |
|---|---|---|---|
| 6,035,402 A | | 3/2000 | Vaeth et al. |
| 6,308,277 B1 * | 10/2001 | Vaeth et al. ................ 726/10 |
| 6,978,364 B1 * | 12/2005 | Balaz et al. ............... 713/153 |
| 6,990,583 B2 * | 1/2006 | Matsuyama et al. ........ 713/175 |
| 7,020,778 B1 * | 3/2006 | Miettinen et al. .......... 713/182 |
| 7,275,155 B1 * | 9/2007 | Aull .......................... 713/157 |
| 2002/0056039 A1 * | 5/2002 | Lim et al. ................... 713/156 |
| 2002/0073311 A1 * | 6/2002 | Futamura et al. ........... 713/157 |
| 2002/0099668 A1 * | 7/2002 | Perlman ...................... 705/76 |

FOREIGN PATENT DOCUMENTS

| | | | |
|---|---|---|---|
| EP | 0 869 637 A2 | | 10/1998 |
| EP | 1 130 844 | | 9/2001 |
| EP | 1 130 844 A2 | | 9/2001 |
| EP | 1130844 A2 * | 9/2001 |

OTHER PUBLICATIONS

"SecureSign® V1.0," SecureSign Certificate Policy and Certification Practice Statement, Japan Certification Services, Inc., Mar. 31, 2000, pp. 1-47.

* cited by examiner

*Primary Examiner*—Christopher Revak
*Assistant Examiner*—Trang Doan
(74) *Attorney, Agent, or Firm*—McDermott Will & Emery LLP

(57) ABSTRACT

A public key certificate generation method includes the steps of: sending a certificate issuing request including a registration contents of a public key certificate and an information content guaranteed by the registration authority, to the issuing authority in a registration authority and generating a public key certificate including the registration contents described in the certificate issuing request the information guaranteed by the registration authority issuing contents issued by the issuing authority, and a signature to the issuing contents in the issuing authority.

12 Claims, 15 Drawing Sheets

PUBLIC KEY CERTIFICATE GENERATION METHOD, VALIDATION METHOD AND APPARATUS THEREOF

BACKGROUND OF THE INVENTION

The present invention relates to a public key certificate issuing technique and a technique for verifying the validity of the public key certificate in the public key infrastructure (PKI).

When transmitting digital data such as an electronic document, a signature and a public key certificate of the transmitting person are added to a subject data. A receiving person checks the digital signature (hereinafter, referred to simply as signature) and the public key certificate added to the received data so as to determine whether the transmitted data has not been altered and whether the data has been transmitted from the transmitting person.

Public key certificate issuing and its validity validation are performed on the public key infrastructure and their standard specifications are defined in RFC2459 (Internet X.509 Public Key Infrastructure Certificate and CRL Profile), RFC2510 (Internet X.509 Public Key Infrastructure Certificate Management Protocols), and the like.

As indicated in the configuration models of RFC2459 (chapter 3) and RFC2510 (1.3), a certificate authority has two main works: a registration work and an issuing work.

The registration work includes registration and examination of a user which are performed in a registration authority.

The issuing work includes issuing of a public key certificate to the user who has been registered, which work is performed by an issuing authority.

It should be noted that in RFC2459 and RFC2510, the authority performing the issuing work is defined as a certificate authority. However, in this Specification, an authority performing the issuing work is defined as an issuing authority. That is, the certificate authority is defined to consist of the registration authority and the issuing authority.

Since the issuing work requires a secured installation and equipment, it is necessary to pay a high maintenance fee and construction fee. For this, an organization to organize a certificate authority may entrust (hereinafter, referred to as outsourcing) the issuing work processing to an external organization (hereinafter, referred to as outsourcing).

Conventionally, two methods have been used for outsourcing the issuing work.

In Method 1, an organization constructing a certificate authority performs identification and examination of an end entity (EE) as an end user by its own registration authority while outsourcing issuing authority works (operation of installation and equipment, and management of issuing authority). An outsourced agency acts for public key certificates of a plurality of registration authorities. Here a secret key of the outsourced agency is used for issuing a public key certificate and the outsourced agency name is described as a public key certificate issuer.

In Method 2, an organization constructing a certificate authority performs registration authority work by its own registration authority while outsourcing issuing authority works such as management of equipment to an outside agency. In the outsourced agency uses an issuing authority equipment and a secret key for each of the certificate authorities. For example, an issuing authority and an issuing authority secret key are provided for each of the different authorities. In this case, the organization name (registration authority manager name) constructing the certificate authority (registration authority manager) name is described as the public key certificate issuer.

For example, the aforementioned two methods are used by Japan Certification Services Inc. (JCSI) which provides a certificate issuing service called SecureSign. The JCSI "SecureSign public service standard rule (V1.0)" (JCSI SecureSign is a registered trademark of the Japan Certificate Service), page 5 has a description as follows.

The SecureSign is divided into two types of services: a "public service" and a "private service". In case of the private service, the certificate policy and CPS (certificate practice statement) are determined by a customer and is disclosed on a network domain required by the customer. On the other hand, in case of the public service, the JCSI is the certificate issuer of the public service and signs the certificate.

When the issuing work and the registration work are performed by different organizations, there is a problem that the responsibility ranges of the issuing authority and the registration authority are not clear, although their responsibility ranges are defined by the Certificate Practice Statement (hereinafter, referred to as CPS). However, when a problem arises in the issued public key certificate (for example, an error is contained in the description items), internal data (log and the like) of the issuing authority and the registration authority should be checked to determine who is responsible. This is not easy and requires quite a time.

SUMMARY OF THE INVENTION

The present invention provides a technique to clearly define a responsibility range of each of parties concerned for contents of a public key certificate.

Moreover, the present invention provides a validation technique for verifying a public key certificate in relation to generation by a plurality of authorities.

Moreover, the present invention provides a technique to be clearly indicated for a user about a public key certificate in relation to generation by a plurality of authorities.

Moreover, the present invention provides apparatuses for a public key certificate issuing, registration, and validation based on the aforementioned technique, a system using the apparatuses, and a processing method for use in the apparatuses and in the system.

More specifically, according to the present invention, when outsourcing an issuing work to other organization, a public key certificate issuing process and validation process as follows are performed.

Following processes are performed when issuing a public key certificate according to the present invention.

A registration authority (RA) apparatus, after identifying and examining an end entity (EE), generates a signature of the registration authority RA to guarantee information to be described in a public key certificate among the information of the end entity, such as a name of the end entity (subject) and a public key (subject public key info). The registration authority sends a public key certificate issuing request having the generated registration authority signature to an issuing authority (IA).

In response to the public key certificate issuing request from the registration authority, the issuing authority apparatus generates a public key certificate. The public key certificate includes the name and signature of the registration authority, and information signed. A signature of the issuing authority for the entire public key certificate is generates and added to the certificate.

To invalidate the validity of the public key certificate of the end entity thus issued, it is necessary to invalidate the public key certificate of the registration authority which has registered to the certificate. More specifically, the registration authority apparatus sends a certificate invalidation request to the issuing authority of the public key certificate. Upon reception of the request, the issuing authority of the public key certificate invalidates the certificate of the registration authority (load the certificate in the invalidation list). This method is effective to invalidate all the end entity public key certificates at once, for example, upon management termination of the registration authority.

When a public key certificate according to the present invention is received by an end entity during a transaction, the end entity performs a validation process for verifying the public key certificate as follows.

Firstly, the end entity apparatus constructs and verify a path from the self-signed certificate of a certificate authority that can be trusted by the end entity up to the public key certificate. Next, the end entity verifies the registration authority signature described in the public key certificate by using the public key of the registration authority. Then, the end entity constructs and verifies a path from the self-signed certificate of the certificate authority trusted by the end entity up to the public key certificate of the registration authority. Here, if the public key certificate of the registration authority has been invalidated, this means that the public key certificate is invalid.

The public key certificate according to the present invention includes a name and signature of the registration authority and information by which a verifying person can know the range guaranteed by a signature. Accordingly, the end entity which has received a public key certificate can know what is guaranteed by the registration authority. Description other than the range guaranteed by the registration authority is to be guaranteed by the issuing authority. Thus, it is possible to clarity the responsibility range of the issuing authority IA and that of the registration authority.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Figure 1:
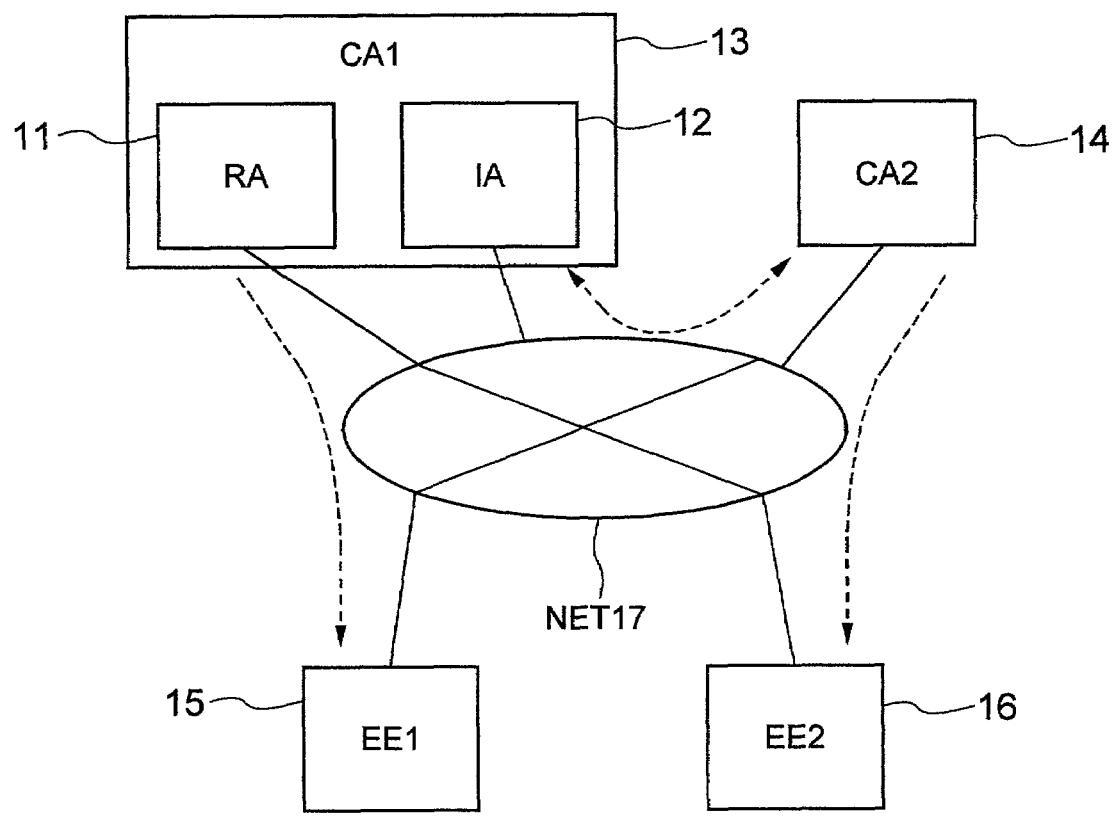
FIG. 1 shows a configuration of a PKI (public key infrastructure) system according to an embodiment of the present invention.

FIG. 1 shows a configuration of a PKI (public key infrastructure) system according to an embodiment of the present invention.

The PKI system according to the embodiment comprises an end entity apparatus EE1 (15) and EE2 (16) performing an electronic procedure, a certificate authority apparatus CA1 (13) and CA2 (14), and a network NET 17 such as Internet for connecting these apparatuses. The certificate authority apparatus CA1 (13) includes a registration authority apparatus RA (11) performing registration work and an issuing authority apparatus IA (12) performing a public key certificate issuing and management work. Each of the registration authority apparatus RA (11) and the issuing authority apparatus IA (12) is connected to the network NET (17).

The issuing authority apparatus IA (12) and the registration authority apparatus RA (11) connected via the network NET (17) need not be located at a position physically identical if they theoretically constitute the certificate authority CA1 (13).

Furthermore, an organization managing the certificate authority apparatus CA1 (13) outsources the issuing authority work to a separate agency and accordingly, different organizations manage the issuing authority IA apparatus (12) and the registration authority RA apparatus (11).

Moreover, as shown by dotted lines, it is assumed that the certificate authority CA1 (13) and the certificate authority CA2 (14) certify each other; the certificate authority CA1 (13) issues its public key certificate to the end entity EE1 (15); and the certificate authority CA2 (14) issues its public key certificate to the end entity EE2 (16). It is assumed that the end entity EE1 (15) and EE2 (16) trust in the certificate authorities CA1 (13) and CA2 (14).

Next, explanation will be given on each of the components constituting the PKI system.

Figure 2:
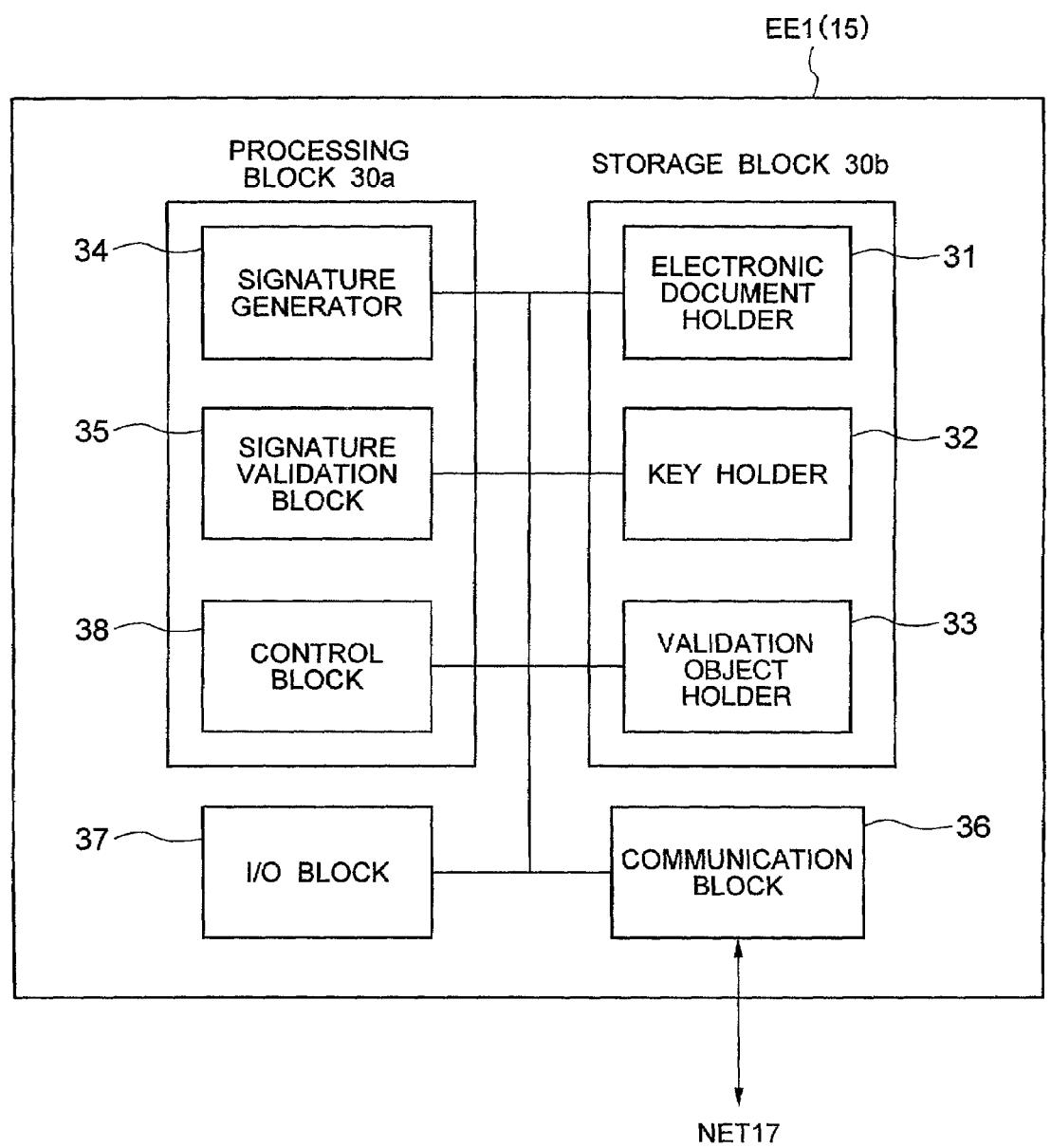
FIG. 2 schematically shows configuration of an end entity (EE) shown in FIG. 1.

Referring to FIG. 2, explanation will be given on the end entity apparatus (hereinafter, referred to as EE apparatus).

The EE apparatus has: a processing block 30a; a storage block 30b; a communication block 36 for communicating with other apparatuses via the network (NET) 17; and an I/O block for input and output of an electronic document generated by a user and an electronic document received from other EE apparatuses, and for reception of specification by the user.

The processing block 30a has: a signature creator 34 for generating a signature to an electronic document, a signature validation block 35 for verifying the signature, and a control block 38 for controlling the respective components of the EE apparatus as a whole.

The storage block 30b has: an electronic document holder 31 for holding the electronic document generated by the user; a key holder 32 for holding a secret key (signature key), a public key certificate of a public key to be used in pair with the secret key, a self-signature certificate of the certificate authority CA entrusted by the end entity EE operating the EE apparatus; and a validation object holder 33 for holding a signed electronic document received from another end entity EE and the public key certificate.

In this configuration, when the control block accepts via the I/O block 37 a user specification to transmit an electronic document held in the electronic document holder 31 to another end entity EE, the control block reads out the electronic document from the electronic document holder 31 and passes the document to a signature generator. The signature generator 34 generates a signature for the received electronic document by using a secret key held in the key holder 32.

The control block 38 adds the signature generated by the signature generator 34 to the electronic document read from the electronic document holder 31, thereby generating a signed electronic document.

The signed electronic document generated and the public key certificate held in the key holder 32 are transmitted via the communication block 36 to a destination EE specified by the user.

When the control block 38 receives via the communication block 36 a signed electronic document and a public key certificate from another EE apparatus, these are correlated and causes the validation object holder 33 to hold them and reports a validation request to the signature validation block 35.

Upon reception of the validation request, the signature validation block 35 verifies the signed electronic document held in the validation object holder 33 by using a corresponding public key certificate.

Then, the signature validation block 35 fetches from the respective certificate authorities via the communication block 36 and a certificate contained in a path from the self-signature certificate of the reliable certificate authority CA1 (13) up to the public key certificate, thereby constructing a path and verifies the path. If this validation has justified the signature, the signed electronic document is handled as an authorized object and output from the I/O block 37 if necessary.

Next, referring to FIG. 3, explanation will be given on the registration authority apparatus (hereinafter, referred to as RA apparatus).

The RA apparatus has: a processing block 40a; a storage block 40b; a communication block 44 for communication with other apparatuses via the network NET 17; and an I/O block 45 for performing input/output of a public key certificate and the like and receiving a request from the RA apparatus operator/user.

The processing block 40a has: a request document generator 43 for generating an electronic document for requesting the IA apparatus to issue a public key certificate or invalidate a public key certificate; and a control block for controlling the RA apparatus as a whole.

The storage block 40b has: a registered user list holder 41 for holding information of end entities EEs registered in the registration authority; and a key holder for holding a secret key of the registration authority and a public key certificate to form a pair with the secret key.

When the control block 46 accept from the RA apparatus operator/user via the I/O block an indication to transmit a public key certificate issuing request document to an issuing authority IA (12), the control block 46 causes the registered user list holder 41 to hold the registration information entered by the RA apparatus operator and reports this to the request document generator 43. Upon receiving this, the request document generator 43 generates a secret key to be used for signature generation by the EE1 apparatus (15) and a public key to be used for validation, and generates a signature for the registration information and for the registration information and the public key of the EE1 by using the secret key held in the registration authority RA (11). Then, the control block 46 generates a public key certificate issuing request document which describes the signature, the public key of the EE1, and the registration information.

The public key certificate issuing request document thus generated is transmitted via the communication block 44 to the IA apparatus (12).

Moreover, when the control block 46 accepts via the communication block 44 a certificate issued in response to the public key certificate issuing request, the control block 46 transmits the request to the end entity EE1 (15) via the I/O block 45 or the communication block 44 or outputs from the I/O block so that the request can be sent by mail.

Moreover, when the control block 46 accepts from the RA apparatus operator an indication to transmit a public key certificate invalidation request document of the EE1 (15), the control block 46 reports it to the request document generator 43. Upon reception of this, the request document generator generates an invalidation request document and transmits it via the communication block 44 to the IA apparatus (12).

Moreover, when the control block accepts a confirmation document in response to the public key certificate invalidation request from the IA apparatus (12) via the communication block, the control block deletes the registration information of the invalidated certificate from the registered user list held in the registered user list holder 41.

Next, referring to FIG. 4, explanation will be given on the issuing authority apparatus (hereinafter, referred to as IA apparatus).

As shown in the figure, the IA apparatus has: a processing block 50a; a storage block 50b; a communication block 55 for communication with other apparatuses via the network NET 17; and an I/O block for input/output of a public key certificate and receiving an indication from an IA apparatus operator.

The processing block 50a has: an issuing block for issuing a public key certificate; a managing block 54 for managing the public key certificate issued by the issuing block; and a control block 57 for controlling the components of the IA apparatus as a whole.

The storage block 50b has: a public key certificate database 51 holding a public key certificate issued by the issuing block; and an certificate revocation list holder 52.

In this configuration, when the control block 57 accepts a public key certificate issuing request from the RA apparatus (11) via the communication block, the control block 57 reports this to the issuing block 53. In response to this, the issuing block 53 generates a public key certificate. Here, the issuing block 53 describes a name of the registration authority RA (11), the signature of the registration authority RA (11), and other items if necessary, and signs the public key certificate using the secret key of the issuing authority (12). The public key certificate thus generated is transmitted via the communication block 55 to the RA apparatus (11). Moreover, this public key certificate is loaded in the public key certificate database 51.

Moreover, when the control block 57 accepts a public key certificate invalidation request from the RA apparatus (11) via the communication block 57, the control block 57 reports this to the managing block 54. In response to this, the managing block 54 deletes the public key certificate to be invalidated, from the public key certificate database 51. The managing block 54 periodically generates certificate revocation list describing information about the public key certificate which has been deleted from the public key certificate database (normally called CRL (certification revocation list) and ARL (authority revocation list) and causes the certificate revocation list holder 52 to hold the certificate revocation list. It should be noted that the managing block 54 is assumed to describe in the invalidation list a date when the next certificate revocation list will be generated.

Moreover, the managing block 54 checks a valid term of each of the public key certificates stored in the public key certificate database 51 and deletes a public key certificate whose validity term has been ended, from the public key certificate database 51.

Figure 3:
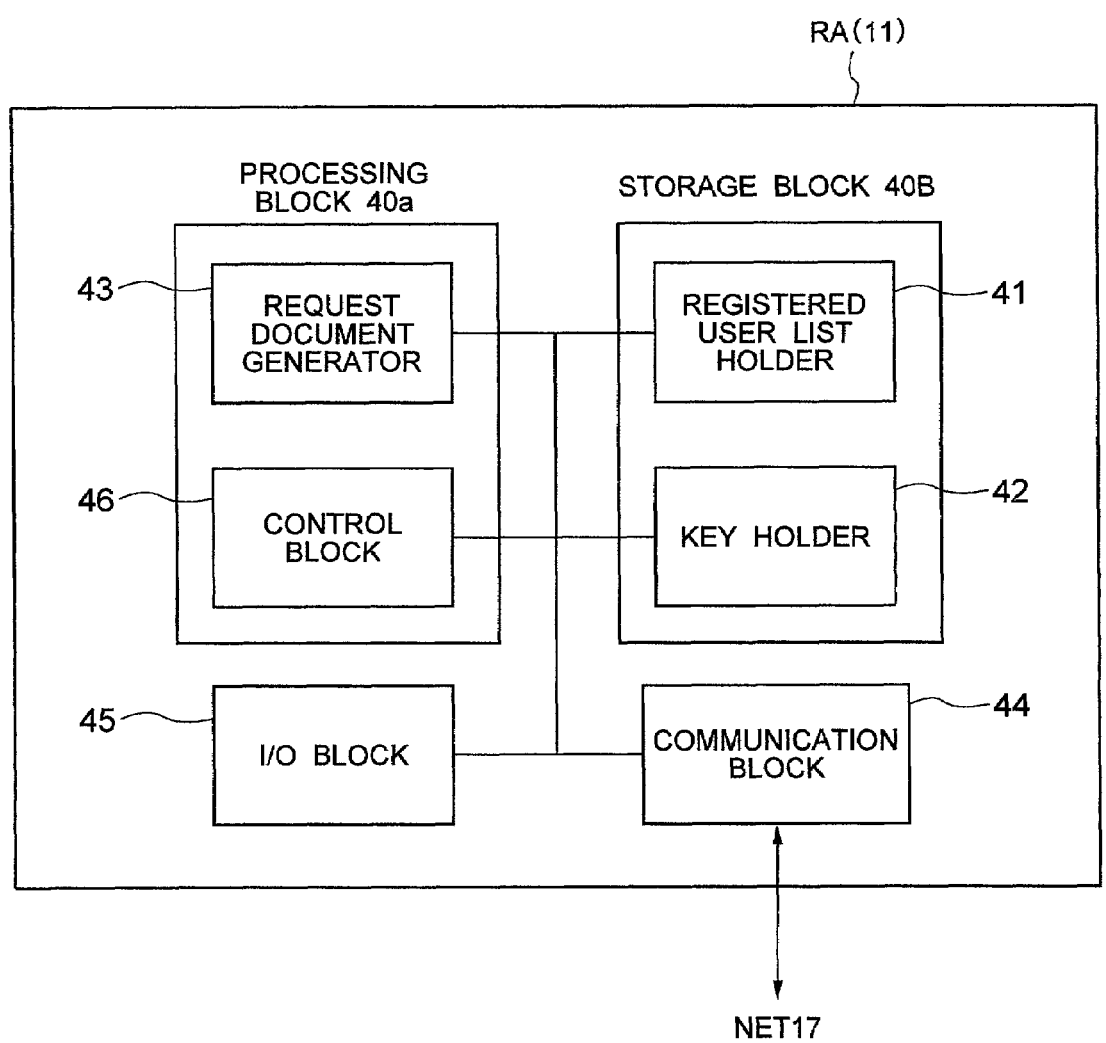
FIG. 3 schematically shows a configuration of a registration authority (RA) shown in FIG. 1.
Figure 4:
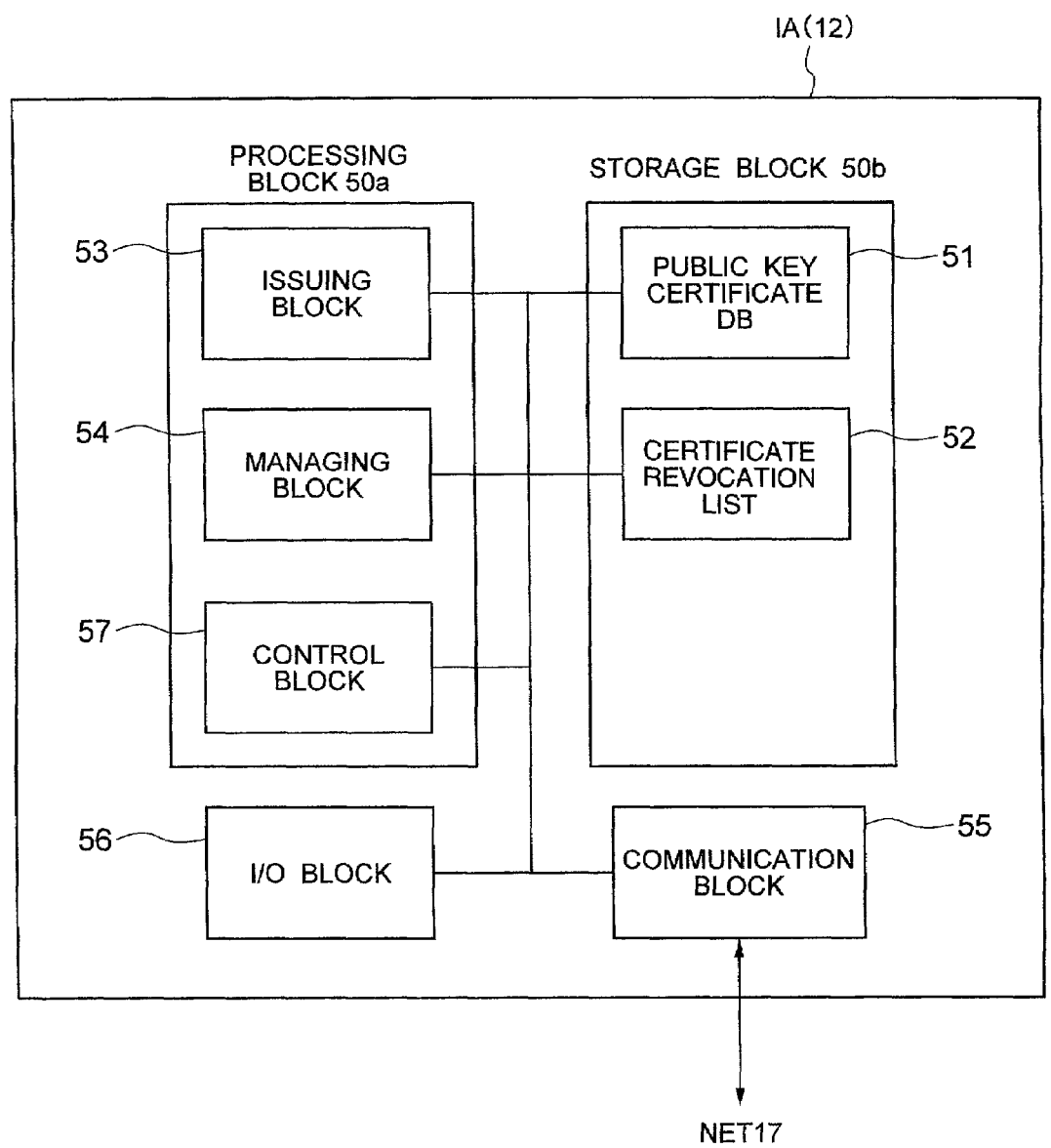
FIG. 4 schematically shows a configuration of an issuing authority (IA) shown in FIG. 1.
Figure 5:
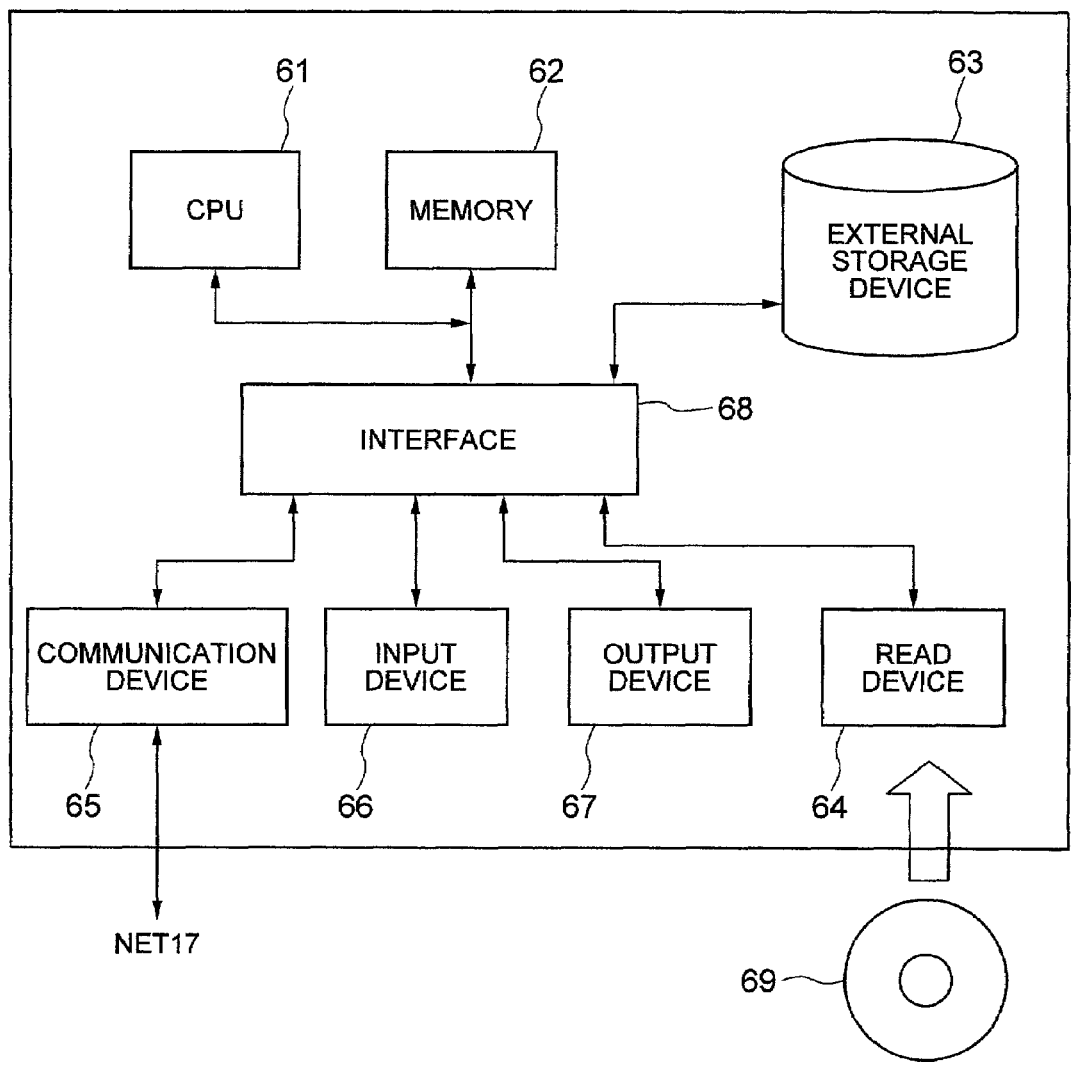
FIG. 5 shows a hardware configuration example of the end entity (EE), the registration authority (RA), and the issuing authority (IA) shown in FIG. 2 to FIG. 4.

The EE apparatus, the RA apparatus, and the IA apparatus shown in FIG. 2 to FIG. 4 can be constructed on an ordinary computer as shown in FIG. 5 for example, which includes: a CPU 61; a memory 62, an external storage device 63 such as a hard disc; a read device 64 for reading information from a general-purpose storage medium 69 such as a CD-ROM; a communication device for communication with other apparatuses via the network NET 17; an input device 66 such as a keyboard and a mouse; an output device 67 such as a monitor and a printer; and interface 68 for data passing between these components.

The CPU 61 executes a predetermined program loaded in memory 62, thereby realizing the respective processing blocks. That is, the communication blocks 36, 44, 55 are implemented when the CPU 61 uses the communication device 66. The I/O blocks 37, 45, and 56 are implemented when the CPU 61 uses the input device 66, the output device 67, and the read device 64. The storage blocks 30b, 40b, and 50b are implemented when the CPU 61 uses the memory 62 and the external storage device 63. Moreover, the processing blocks 30a, 40a, and 50a are realized as a process of the CPU 61.

The aforementioned predetermined program is read out via the read device 64 from the storage medium 69 or downloaded from another apparatus connected via the communication device 66 to the network and introduced to the external storage device 63.

Next, explanation will be given on operation of the end entity EE1 (15), registration authority RA (11), and issuing authority IA (12) when they are in the relationship of certificate authority CA1 (13) and the end entity EE1 (15) as shown in FIG. 1.

The operation of the end entity EE1 (15), the registration authority RA (11), and the issuing authority IA (12) according to the present embodiment is divided into a public key certificate issuing operation and invalidation operation.

Explanation will be given on the public key certificate issuing operation performed by the end entity EE1 (15), the registration authority RA (11), and the issuing authority having the aforementioned configuration.

Figure 6:
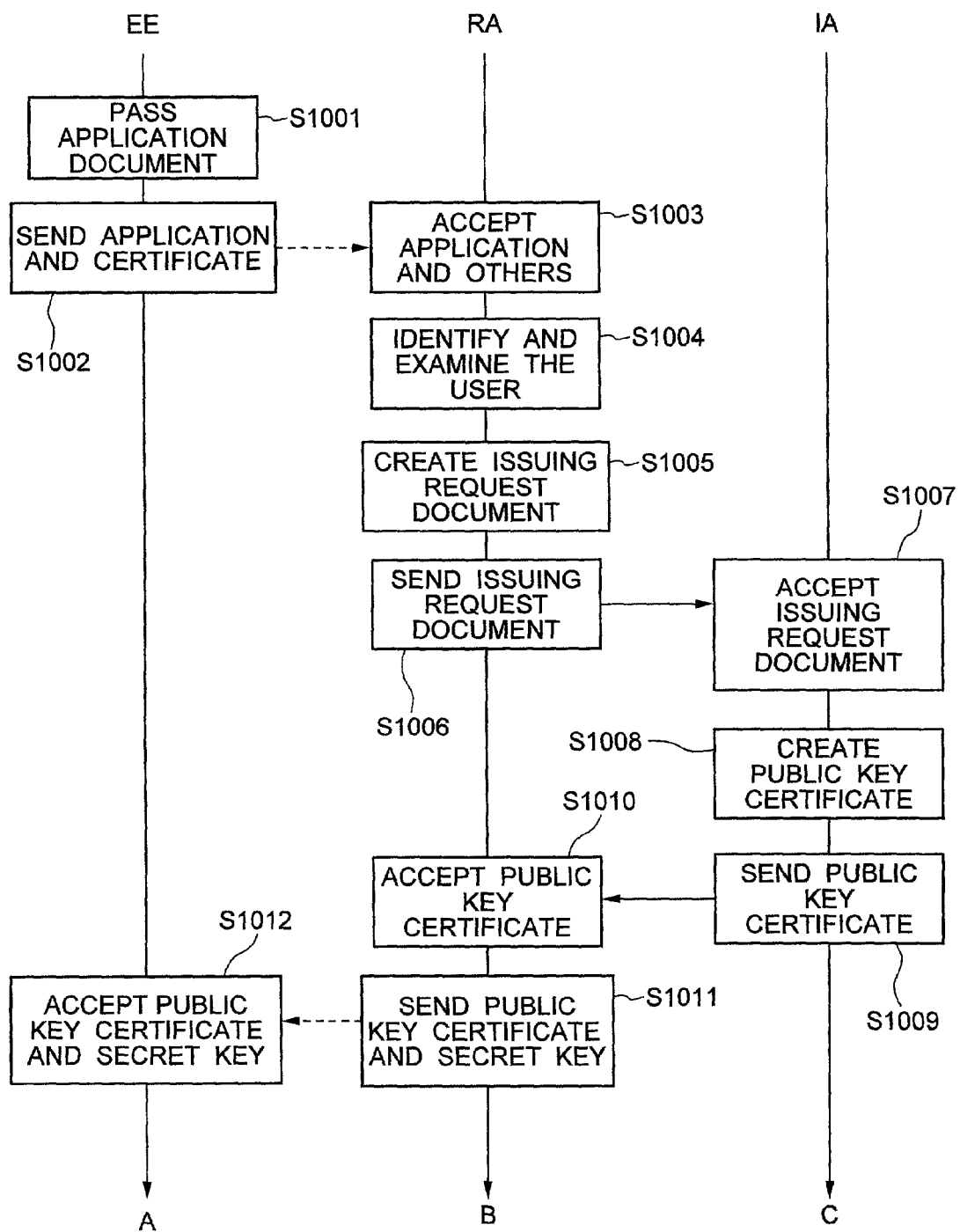
FIG. 6 is a flowchart showing a public key certificate issuing operation executed in the end entity (EE1), the registration authority (RA), and the issuing authority (IA) shown in FIG. 1.

FIG. 6 is a flowchart for explaining the public key certificate issuing operation performed by the end entity EE1 (15), the registration authority RA (11), and the issuing authority IA (12) according to the present embodiment.

A user of the EE1 apparatus generates a written application containing information required for requesting for a public key certificate issuing (step S1001) and sends it by mail or passes it to an operator of the RA apparatus (11) together with a certificate assuring that the information described in the application is true (step S1002).

The operator of the RA apparatus receives the application for the public key certificate issuing and the related certificates (1003) and examines whether the contents of the application are truly for the information for the user of the end entity EE1 (15) who can issue a public key certificate (S1004).

Next, an operator of the RA apparatus (11) inputs the registration information of the user of the EE1 apparatus (15) described in the application, via the I/O block 45 and specifies to transmit a public key certificate issuing request for this EE1 (15 to the IA apparatus (12). The request document generator 43 creates a public key certificate issuing request document (step S1005).

Figure 7:
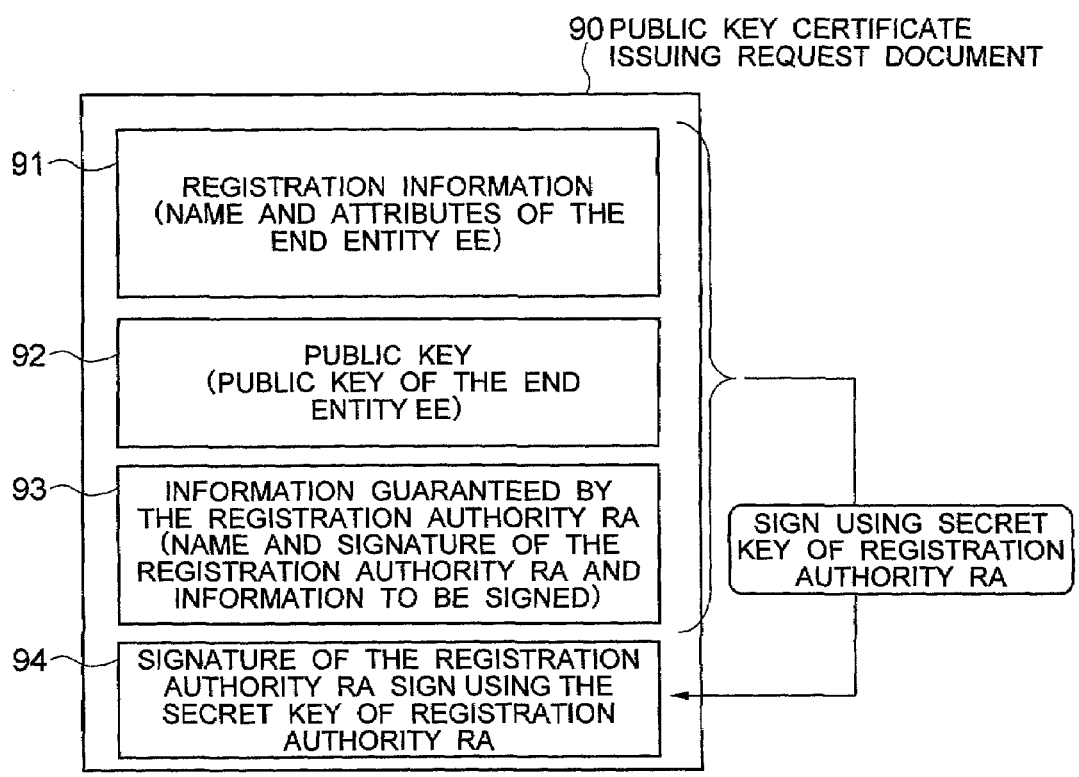
FIG. 7 shows a brief configuration of a public key certificate issuing request document created in step S1005 in FIG. 6.

Specific operation of the request document generator 43 has been explained above. As shown in FIG. 7, the generated public key certificate issuing request document 90 includes; a registration information 91; a public key 92 corresponding to a secret key used by the EE1 apparatus (15) to use for an electronic document signature; information including a registration authority name, a signature, and a signature object information 93 and guaranteed by the registration authority RA (11); and a signature 94 of the registration authority RA (11) for these information items (91, 92, 93).

The request document creator 43 transmits the generated public key certificate issuing request document via the communication block 44 and the network NET 17 to the IA apparatus (112) (step S1006).

The issuing authority IA (12) certifies the public key certificate issuing request document 90 issued by the registration authority RA (11) using a known technique and accepts the document. (step S1007).

Figure 8:
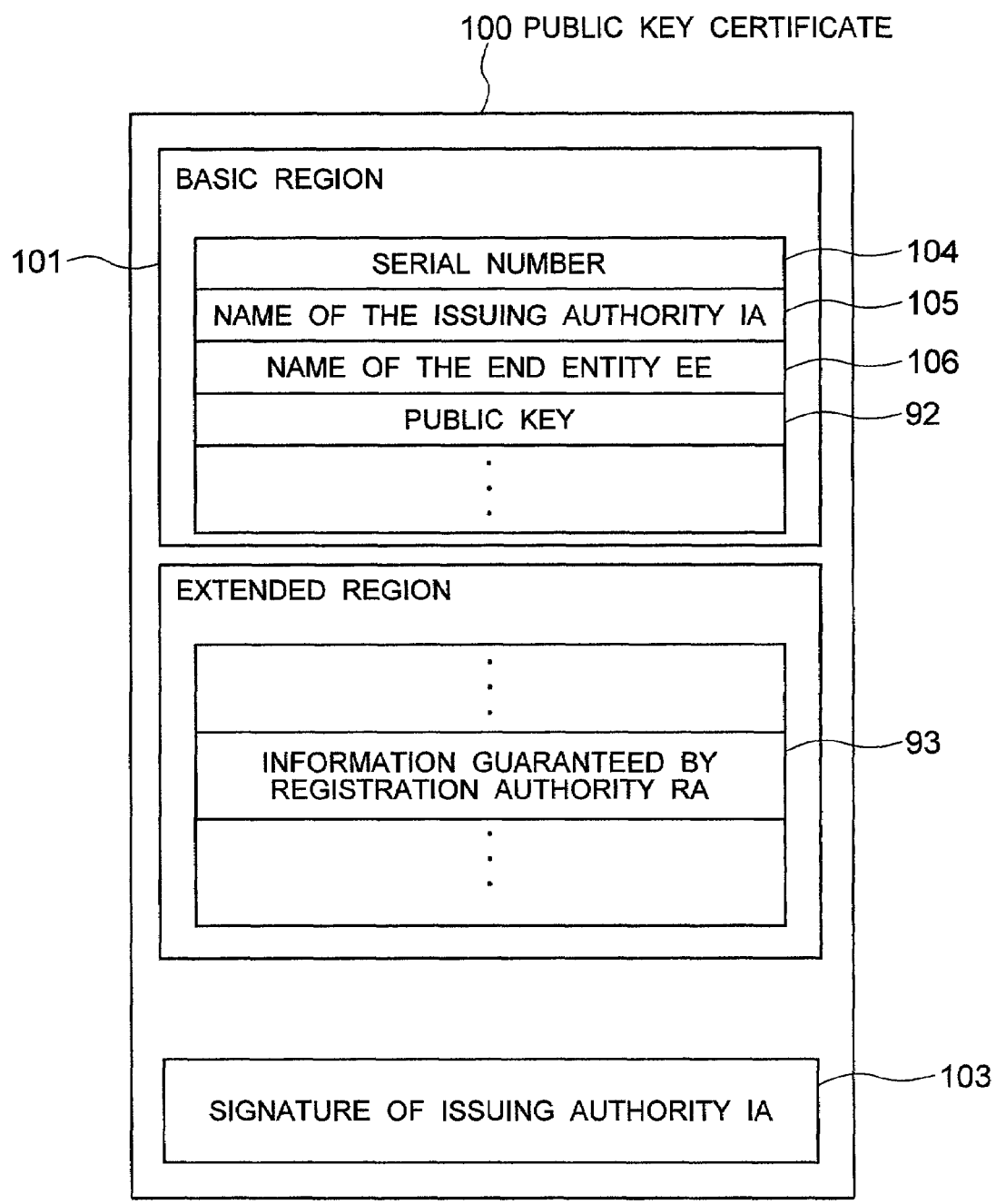
FIG. 8 shows a brief configuration of a public key certificate generated in step S1009 in FIG. 6.

In response to the public key certificate issuing request, the issuing block 53 generates a public key certificate 100 shown in FIG. 8 (step S1008).

Information described in the public key certificate includes: information to be specified by the issuing authority IA such as a name 105 of the issuing authority IA (12) issuing the public key and a certificate serial number allocated to the issuing authority (12); and information extracted by the issuing block 53 from the information included in the public key certificate request document 90 such as the name 106 of the end entity EE1 who needs the public key certificate, a public key 92, and information 93 guaranteed by the registration authority RA (11).

As shown in FIG. 8, the public key certificate 100 is divided into a basic region 101, an extended region 102, and an issuing authority signature 103. The basic region 101 includes the serial number 104, the issuing authority name 105, the end entity EE name 106, and the public key 92 of the end entity EE1 (15) while the extended region describes information 93 guaranteed by the registration authority RA.

Next, the issuing block 53 generates a secret key of the issuing authority for the basic region 101 and the extended region 102 and creates the public key certificate 100.

The IA apparatus (12) loads the generated public key certificate 100 in the public key certificate database 51 and transmits it via the network NET 17 to the RA apparatus (11) (step 1009).

The RA apparatus (11) accepts the public key certificate 100 via the network NET 17 (step S1010) and transmits the public key certificate 100 and the corresponding secret key via the communication block 36 or the I/O block by a safe method: electronic communication or postage mail (step S1011).

The EE1 apparatus accepts 15 from the RA apparatus (11) the public key certificate 100 and the corresponding secret key (S1012) and holds them in the key holder 32.

Next, explanation will be given on the public key certificate request document 90 and the information 93 described in the extended region 102 of the public key certificate 100 and guaranteed by the registration authority RA.

Firstly, referring to FIG. 9, explanation will be given on the information 93 guaranteed by the registration authority RA by using the signature object identifier.

Figure 9:
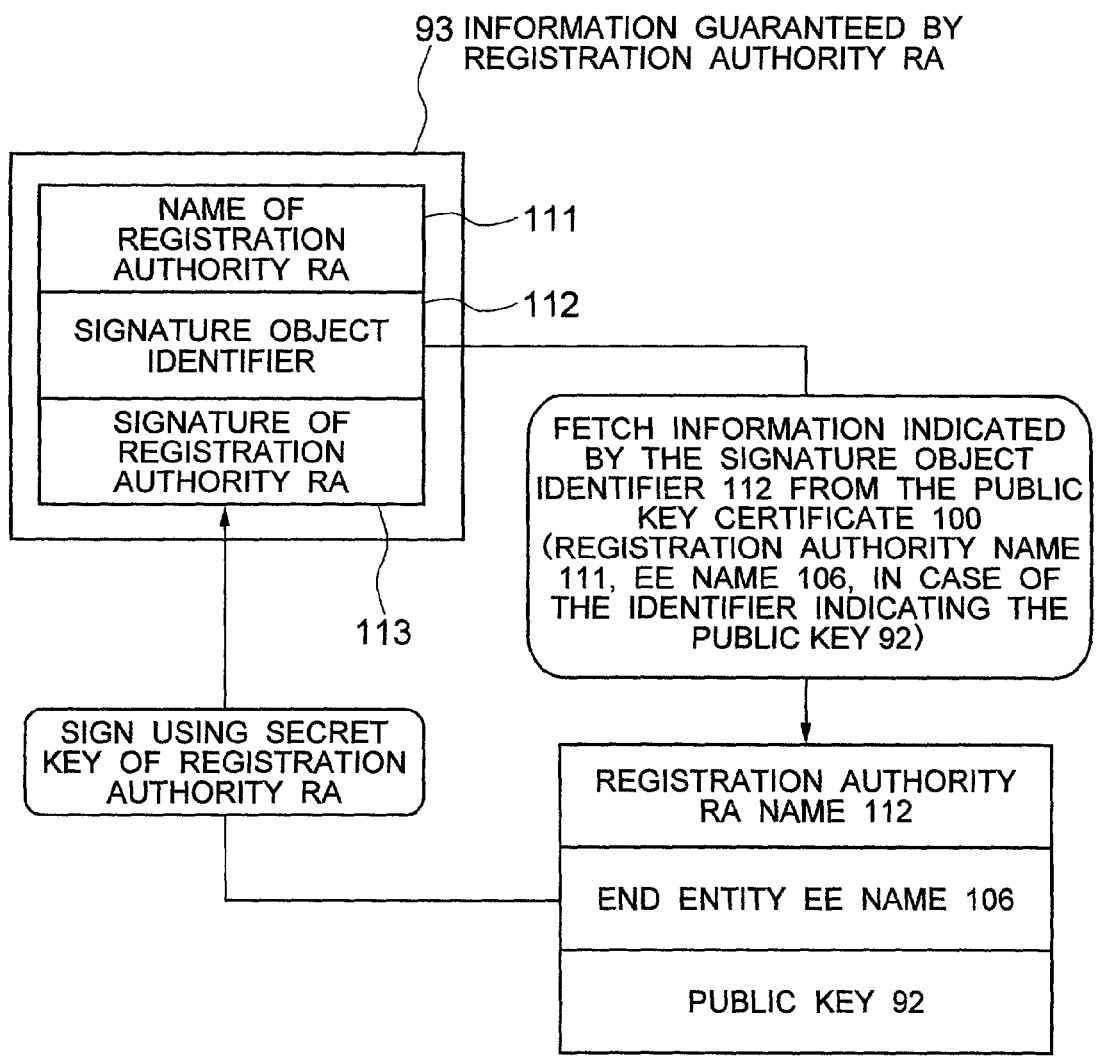
FIG. 9 shows a brief configuration of information 93 shown in FIG. 8 when a signature identifier is used.

As shown in FIG. 9, when the signature object identifier is used, the information guaranteed by the registration authority RA includes: a name 111 of the registration authority RA; the signature object identifier 112 specifying the information guaranteed by the registration authority RA; and a signature 113 of the registration authority generated by the secret key of the registration authority RA.

More specifically, the signature object identifier 112 specifies the information to be described in the public key certificate among the information checked and examined by the registration authority in step S1004. Information to be guaranteed by the registration authority RA includes, for example, the end entity name (subject name), the public key and attribute information of the end entity EE. There are various ways of selecting the object information. For this, at least one identifier specifying at least one combination of the object information items is decided in the system and loaded in such a way that it can be accessed by the registration authority RA, the end entity EE, and the issuing authority IA. The registration authority RA generates a signature for the information specified by this identifier (RA signature 113).

When the information 93 to be guaranteed by the registration authority RA is described by using the signature object identifier as in the aforementioned embodiment, the signature object identifier is loaded according to the information guaranteed by the registration authority RA. Accordingly, various combinations can be specified as the signature object information and can work around the needs of the certificate authority CA flexibly.

Moreover, there is a method using a hash value of the signature object information.

Figure 10:
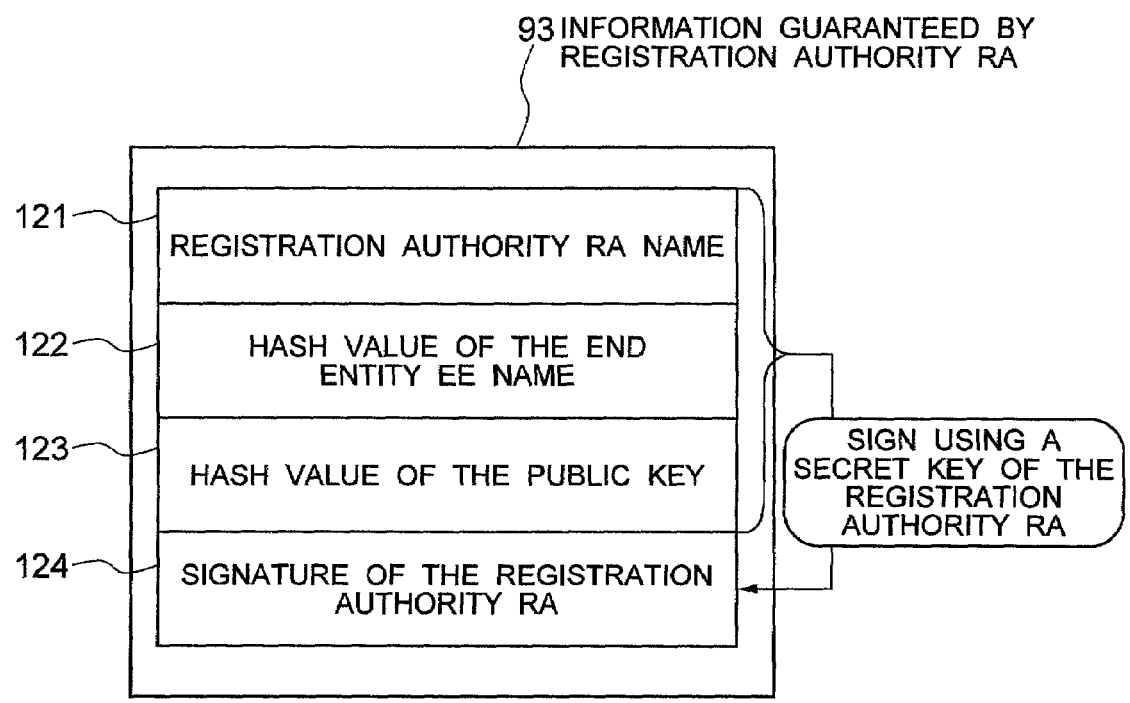
FIG. 10 shows a brief configuration of information 93 shown in FIG. 8 when a hash value of the registration information is used.

As shown in FIG. 10, when using the hash value of the signature object information, the information 93 guaranteed by the registration authority RA includes: a registration authority name 121, hash value blocks 122, 123 of the information guaranteed by the registration authority, and a registration authority name 124 generated by the secret key of the registration authority (11).

Among the information checked and examined by the registration authority RA (11) in step S1004, the information to be described on the public key certificate is described in hash values in the hash value blocks 122, 123 of the information guaranteed by the registration authority RA. The information guaranteed by the registration authority RA includes, for example, an end entity EE name (subject name), public key, and other attribute information of the end entity EE.

The registration authority RA (11) generates a signature (signature 124 of the registration authority RA) for a registration authority RA name 121 and for the hash value block 122, 123 guaranteed by the registration authority RA.

When the registration authority RA describes the information block 93 by using the hash value of the signature object information, it is necessary to check whether respective object information hash values correspond to the information described in the certificate. However it is also possible to indicate the guarantee object information by a signature without loading the signature object identifier.

Next, explanation will be given on an invalidation operation of the public key certificate of the registration authority RA (11) in the registration authority (11) and the public key certificate issuing authority of the registration authority.

When invalidating a public key certificate, a managing person (responsible person) of the registration authority RA (11) sends a public key certificate invalidation request document to the public key certificate issuing authority of the registration authority RA by an assured method (sending a signed document by electronic communication or physical handing).

The public key certificate issuing authority of the registration authority RA (11) checks whether the public key certificate invalidation request document has been issued by the registration authority RA (11) using a known technique and accepts the document.

The public key certificate issuing authority of the registration authority RA (11) invalidates the public key certificate of the registration authority RA (11) by using a known technique, i.e., by deleting the public key certificate of the registration authority RA (11) from the database of the public key certificate issuing authority of the registration authority RA (11). The public key certificate issuing authority periodically issues a certificate invalidation list signed by the certificate issuing authority.

Thus, in the public key certificate according to the present embodiment, by invalidating a public key certificate of the registration authority RA, it is possible to invalidate documents for each of the registration authorities RA. By using this method, it is possible to reduce the certificate invalidation list capacity as compared to invalidation of public key certificates of all the end entities EE.

Next, referring to FIG. 1, explanation will be given on an operation performed when the EE2 apparatus (16) verifies a public key certificate of the EE1 apparatus (15).

When a signed electronic document and a public key certificate are received by the EE2 apparatus (16) from the EE1 apparatus (15), the EE2 apparatus, as has been described above, verifies the electronic document and the public key certificate.

Figure 11:
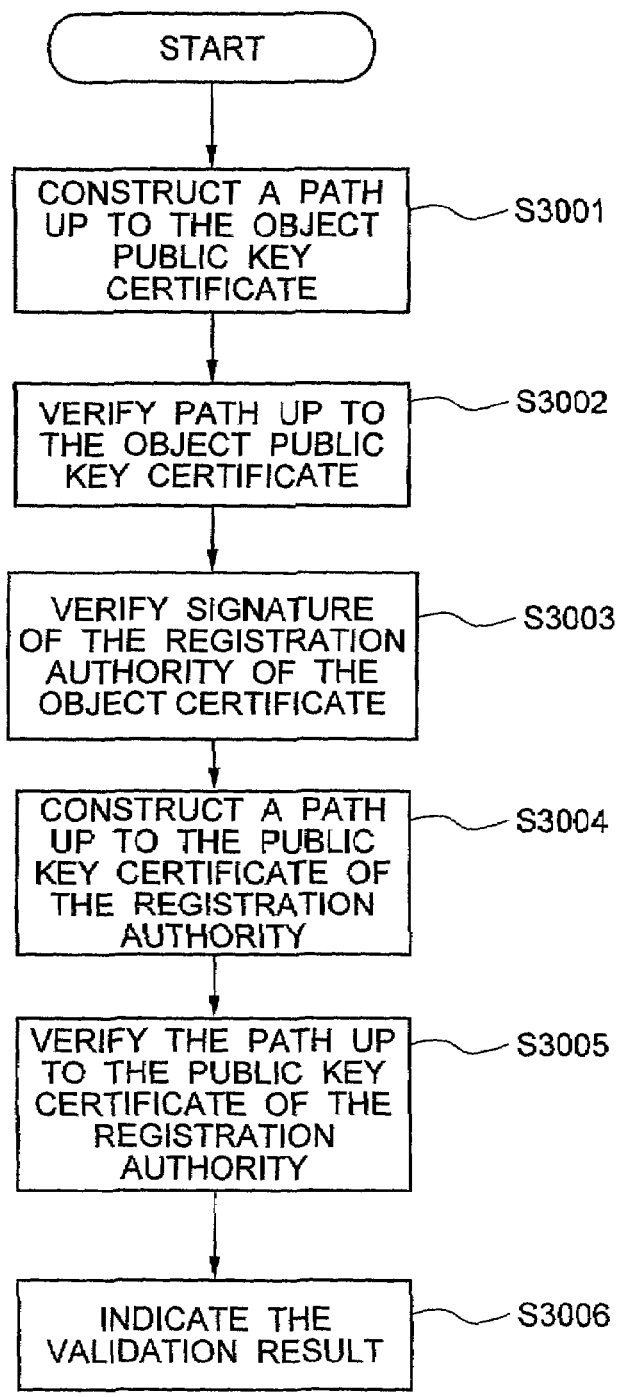
FIG. 11 is a flowchart showing operation performed by the end entity (EE2) in FIG. 1 verifies the public key certificate of end entity (EE1).

FIG. 11 is a flowchart explaining the public key certificate validation performed by the signature validation block 35 of the EE2 apparatus (16).

The signature validation block 35 accepts an indication to verify a public key certificate from the EE2 and constructs a path from the self-signature certificate of the certificate authority CA2 trusted by the EE2 apparatus (16) up to the public key certificate of the end entity EE1 (15) (step S3001).

More specifically, the signature validation block 35 of the EE2 apparatus (16) fetches the issuing authority name information (IA name) of the certificate from the public key certificate of the end entity EE1 (15).

Then, the EE2 apparatus (16) accesses the public key certificate database 181 of the IA apparatus (12) and gets a public key certificate issued from the certificate authority CA2 (14) to the issuing authority IA (12). The certificate is held in the key holder 32.

Since the certificate authority CA2 (14) is trusted by the end entity EE2 (16), a certification path can be constructed by collecting: the public key certificate of the end entity EE1 (15) transmitted from the end entity EE1; the public key certificate of the issuing authority IA (12) fetched from the IA apparatus (12); and a self-signature certificate of the certificate authority CA2 held in the key holder 32.

The signature validation block 35 verifies the path constructed in step S3001 by verifying certificates as follows (step S3002). The signature validation block 35, using the public key of the certificate authority CA2 (14) contained in the self-signature certificate of the certificate authority CA2 (14), verifies the signature attached to public key certificates and checks whether the public key certificates are matched in contents. Next, by using the public key of the issuing authority IA (12) contained in the public key certificate of the issuing authority IA (12), a signature attached to the public key certificate of the end entity EE1 is verified and check is made whether the contents of these public key certificates are matched.

As has been described above, the path is verified by performing the signature validation and the matching for all the certificates constituting the certification path.

Next, according to a particular information item (such as RA name) specifying a registration authority described in the public key document to be verified, the signature validation block 35 fetches a public key certificate of the registration authority RA from the database of the issuing authority which has issued the certificate, and by using a public key of the registration authority (11) contained in the public key certificate of the registration authority RA, verifies the signature of the registration authority RA described in an extended region of the public key certificate of the end entity EE1 (15) (step S3003). Moreover, it is possible to describe the public key certificate of a registration authority RA in an extended region of the public key certificate to be verified, so as to be fetched by the verifying person.

The signature validation block 35 constructs a path to the public key certificate of the registration authority RA (11) used in step S3003 (step S3004).

That is, a path is constructed from the certificate authority CA2 (14) trusted by the end entity EE2 (16) up to the registration authority RA (11). The path up to the registration authority RA (11) varies depending on where the public key certificate has been issued.

Figure 14:
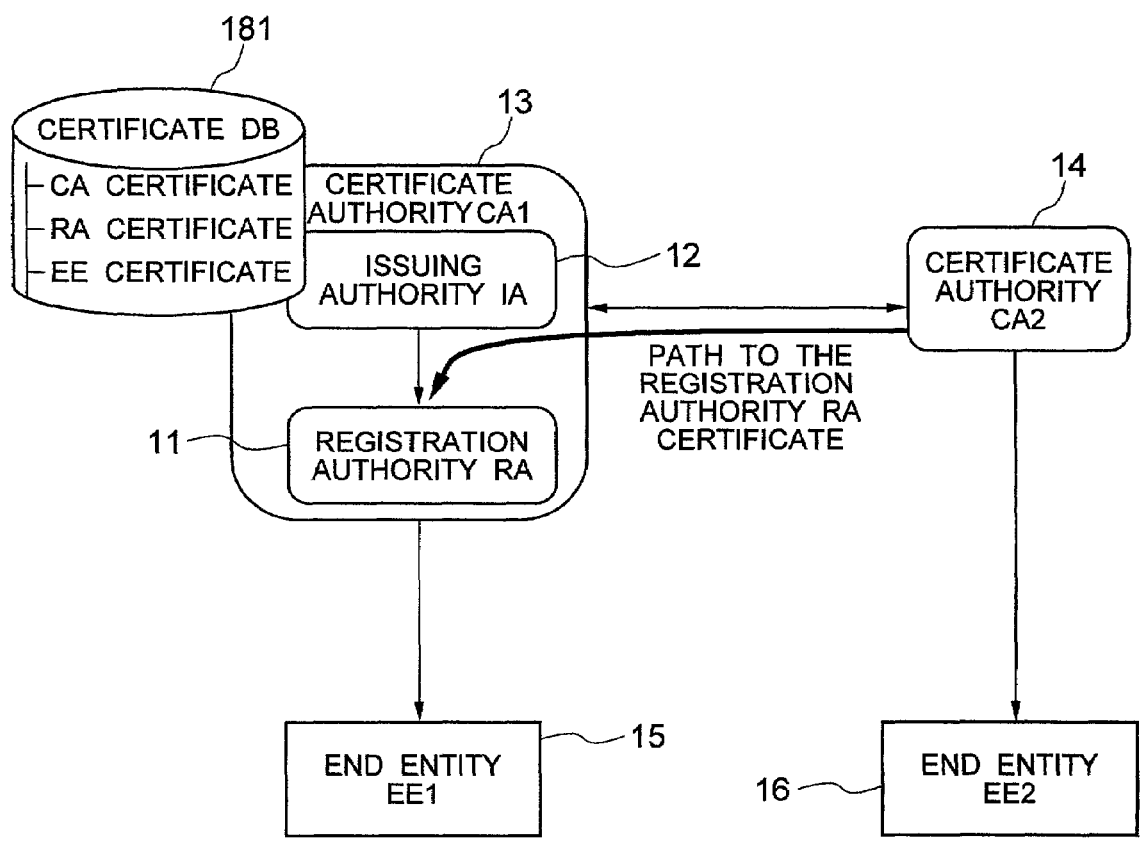
FIG. 14 shows a brief configuration in case a certificate of a registration authority is issued by an issuing authority (IA).
Figure 15:
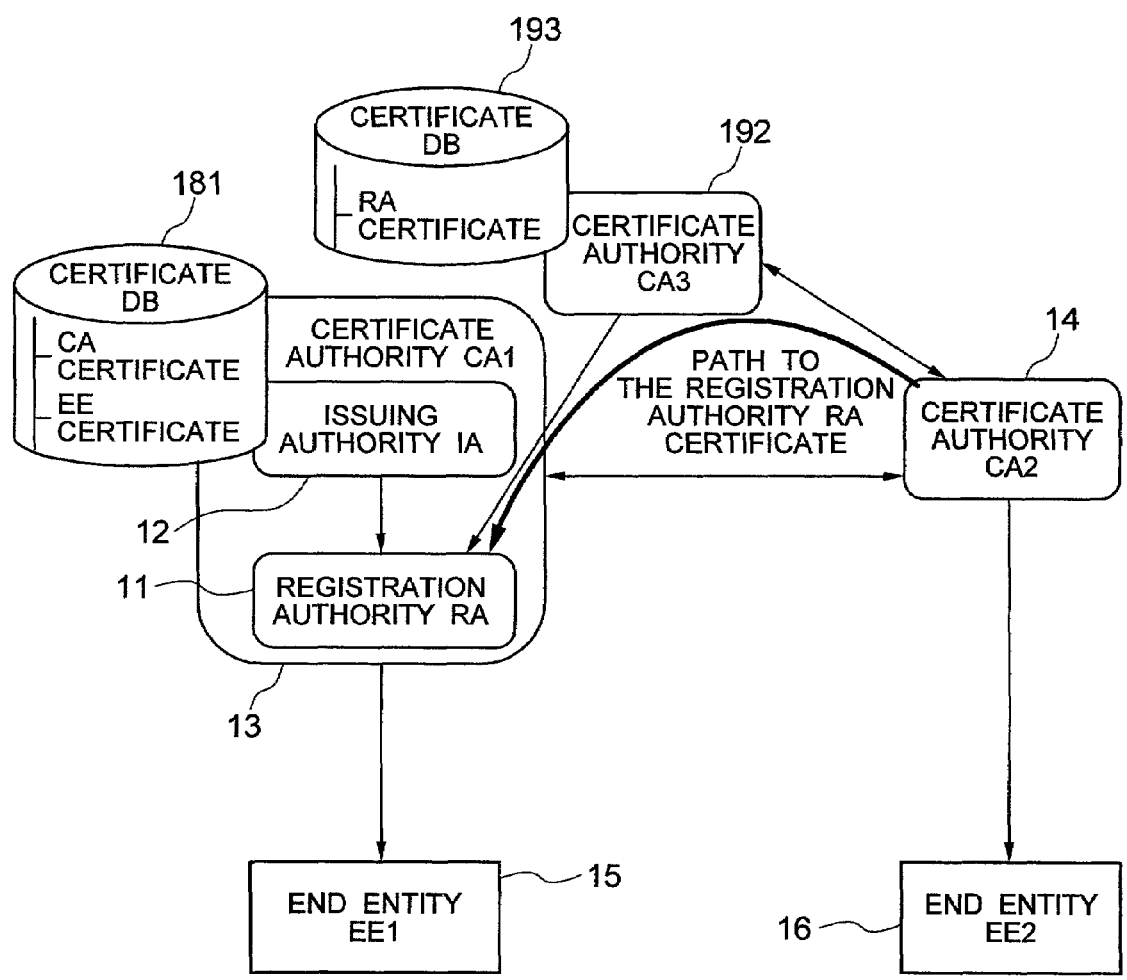
FIG. 15 shows a brief configuration in case the certificate of the registration authority is issued by another certificate authority (CA3).

Firstly, as shown in FIG. 14, explanation will be given on a case when the path up to the public key certificate of the registration authority RA (11) is constructed when the public key certificate of the registration authority RA has been issued by an issuing authority IA (12).

The signature validation block 35 fetches from the public key certificate of the registration authority RA (11), information of the issuing authority IA which has issued the public key certificate.

Then, the signature validation block 35 accesses the public key certificate database 181 of the IA apparatus (12) which has issued the certificate and the issuing authority IA (12) fetches the public key certificate issued from the certificate authority CA2 (14).

Since the certificate authority CA2 (14) is trusted by the end entity EE2 (16), the certification path is constituted by the public key certificate of the registration authority RA (11) used in step S3003, the public key certificate of the issuing authority IA (12) fetched from the public key certificate database 181 of the IA apparatus, and the self-signature certificate of the certificate authority CA2 (14) held in the key holder 32.

Here, since the public key certificate of the issuing authority IA (12) and the self-signature certificate of the certificate authority CA2 (14) have been already used in step S3001, it is assumed that they can be used again in this step.

The control block 38 of the EE2 apparatus verifies the path up to the registration authority RA (11) constructed in step S3004, by the same method as step S3002 (step S3005).

If the aforementioned validation steps S3002, S3003, and S3005 are all successful, then it is confirmed that the public key certificate of the end entity EE1 (15) is valid. The confirmation result is indicated to the user via the I/O block 37 of the EE2 apparatus (16) (step S3006).

Moreover, unlike the aforementioned embodiment, the public key certificate of the registration authority RA (11) may have been issued from a certificate authority CA3 (192) performing inter-validation with the certificate authority CA2 (14). In this case, the path to the public key certificate of the registration authority RA (11) is constructed as follows.

The signature validation block 35 fetches from the public key certificate of the registration authority RA (11) used in step S3003, information of certificate authority CA3 (192) which has issued the public key certificate of the registration authority RA (11), and accesses a public key certificate database (193) of the certificate authority CA3 (192), so that the certificate authority CA3 (192) can fetch a certificate issued from the certificate authority CA2 (14).

Since the certificate authority CA2 (14) is trusted by the end entity EE2 (16), the validation path is constituted by the public key certificate of the registration authority RA (11) used in step S3003, the public key certificate of the certificate authority CA3 fetched from the public key certificate database 193 of the certificate authority CA3, and the self-signature certificate of the certificate authority CA2 (14) held in the key holder 32.

Moreover, the validation method of the registration authority RA signature varies depending on the method specifying the information block 93 guaranteed by the registration authority RA (11).

Firstly, explanation will be given on a validation method for verifying a signature 113 of a registration authority RA in which a signature object identifier is used for specifying the information block 93 guaranteed by the registration authority RA.

Figure 12:
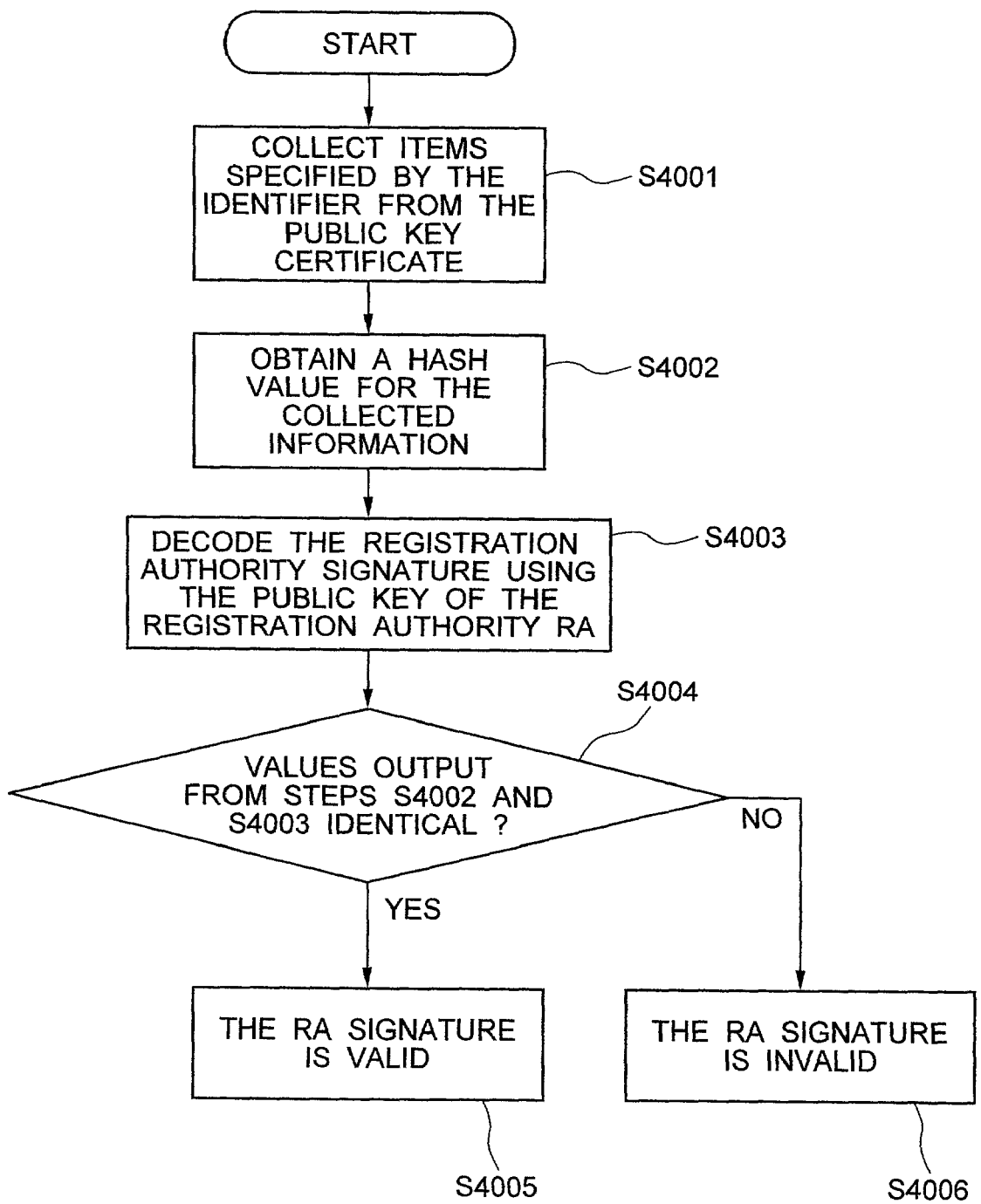
FIG. 12 is a flowchart for validation operation by a registration authority's signature 113 when the information 92 is guaranteed by the registration authority (RA) using a signature identifier.

FIG. 12 is a flowchart for explaining operation for the end entity EE2 (16) to verify the signature 113 of the registration authority RA by using a signature object identifier.

The signature validation block 35 of the end entity EE2 (16) collects items (registration authority name, entity EE name, and public key in the examples of FIG. 9) specified by the signature object identifier 112 described in the public key certificate (step S4001) and fetches their hash value (step S4002). In addition to this, the public key described in the public key certificate of the registration authority RA (11) is used to decode the signature 113 of the registration authority RA described in the public key certificate of the end entity EE1 (15) (step S4003). Then, values output from steps S4002 and S4003 are compared to determine whether they are identical (step S4004)

If they are identical, this means that the signature 113 of the registration authority RA has been verified to be valid (step S4005). On the contrary, if they are not identical, this means that the signature 113 of the registration authority RA is invalid (step S4006).

Next, explanation will be given on a validation method for verifying a signature 124 of a registration authority RA in which a signature object information hash value is used for specifying the information block 93 guaranteed by the registration authority RA.

Figure 13:
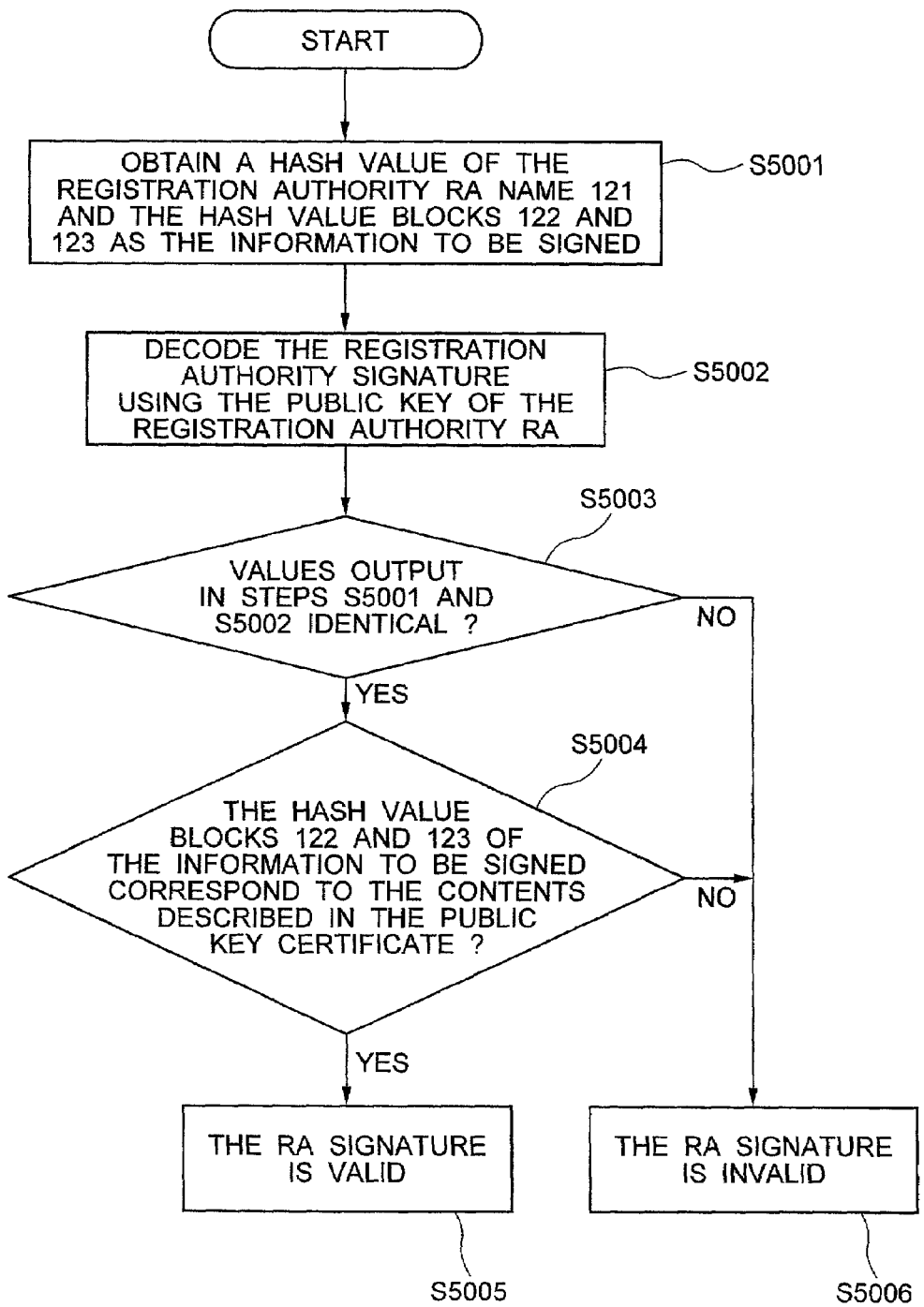
FIG. 13 is a flowchart for validation operation by a registration authority's signature 124 when the information 92 is guaranteed by the registration authority (RA) using the hash value of the registration information

FIG. 13 is a flowchart for explaining operation for the end entity EE2 (16) to verify the signature 113 of the registration authority RA by using the hash value of the signature object information.

The signature validation block 35 of the end entity EE2 (16) fetches a registration authority name and a hash value for the hash value blocks 122, 123 (step S5001). In addition to this, the public key described in the public key certificate of the registration authority RA (11) is used to decode the signature 124 of the registration authority RA described in the public key certificate of the end entity EE1 (15) (step S5002). Then, values output from steps S5001 and S5002 are compared to determine whether they are identical (step S5003). If they are not identical, this means that the signature 124 is invalid. IF they are identical, control is passed to step S5004.

Step S5004 checks whether values of the hash value blocks 122,123 of the registration information correspond to the information items of the public key certificate. That is, if the hash of the end entity EE name of the public key certificate is identical to the hash value 122 of the end entity EE name, and similarly, whether the hash value of the public key 92 is identical to the hash value of the public key.

If they are identical, this means that the signature 124 of the registration authority RA has been verified to be valid (step S5005). On the contrary, if they are not identical, this means that the signature 124 of the registration authority RA is invalid (S5006).

Thus, the embodiments of the present invention have been explained thus far.

In the aforementioned embodiments, the information block 93 guaranteed by the registration authority RA and containing the signature 113 (or 124) of the registration authority RA is described in the extended region of the public key certificate of the end entity EE1 (15). Another end entity EE which has received that public key certificate verifies the signature of the registration authority RA of the public key certificate, thereby confirming that described items specified by the information block 93 guaranteed by that registration authority RA are guaranteed by the registration authority RA. That is, the end entity EE which has received the public key certificate can confirm that the end entity EE1 (15) described on the public key certificate has been examined and confirmed. Items other than the described items indicated by the information block 93 guaranteed by the registration authority RA are guaranteed by the issuing authority IA by verifying the signature of the issuing authority IA of the public key certificate.

It should be noted that the present invention is not to be limited to the aforementioned embodiments and can be varied in various ways within the spirit and scope of the invention.

For example, in the aforementioned embodiments, a user-self identification and examination are performed at one registration authority RA, but the present invention is not limited to this. It is also possible that the user-self of the end entity EE1 (15) is identified and examined in a plurality of registration authorities RA and a plurality of information blocks 93 guaranteed by the registration authorities RA are described in the extended region of the public key certificate so as to indicate what kind of information has been confirmed by the respective registration authorities RA.

Moreover, in the aforementioned embodiments, a public key certificate includes information for a examiner to know the signature object range. In contrast to this, it is also possible for the system to define in advance the signature object information to be guaranteed by the registration authority. In this case, a registration authority RA (11) generates a signature of the registration authority (11) for information specified in advance. In the information block 93 guaranteed by the registration authority RA, only the name of the registration authority RA and signature need to be described.

Explanation will be given on the registration authority signature validation method in this case.

Firstly, items specified as signature object information are collected from the public key certificate and a hash value is fetched from them. Then, the signature of the registration authority RA is decoded by a public key of the registration authority RA to check whether it is identical to the aforementioned value. If identical, this means that the signature of the registration authority RA has been verified to be valid. On the contrary, if not identical, this means that the signature of the registration authority RA is invalid.

When a registration authority RA is specified in advance, there is no need of check correspondence between the hash value of the signature object information and the items of the public key certificate. Accordingly, the validation process is reduced as compared to a case using the hash value of the signature object information.

According to the present invention, an end entity EE which has received a public key certificate can check which of information items described on the public key certificate are guaranteed by the registration authority RA. That is, the end entity EE can check contents of the public key certificate (who guarantees what).

The specification and drawings are, accordingly, to be regarded in an illustrative rather than a respective sense. It will, however, be evident that various modifications and changes may be made thereto without departing from the broader sprit and scope of the invention as set forth in the claims.

We claim:

1. A method for generating a public key certificate of an end entity by a registration authority and an issuing authority in a public key infrastructure, comprising the steps of:

generating, by the registration authority, a signature to contents to be registered with a public key certificate having its own valid term, and a certificate issuing request including both the contents signed by the registration authority and a signature to the contents signed by the registration authority;

sending the certificate issuing request from the registration authority to the issuing authority;

generating, in response to the certificate issuing request, by the issuing authority, a public key certificate including the contents signed by the registration authority, the signature to the contents signed by the registration authority, issuing contents to be issued by the issuing authority, and an issuing authority signature to the contents signed by the registration authority, the signature to the contents signed by the registration authority and the issuing contents issued by the issuing authority;

sending the public key certificate from the issuing authority to the registration authority for being registered within the registration authority;

deleting information, at the registration authority, on the public key certificate having been generated if the valid term has been ended; and deleting information, at the registration authority, on the public key certificate having been generated in response to a public key certificate invalidation request sent from the issuing authority.

2. A method as recited in claim 1, wherein
the contents signed by the registration authority is a predetermined identifier to specify information to be certified by the public key certificate of the end entity.

3. A method as recited in claim 1, wherein
the contents signed by the registration authority is a hash value calculated by applying a hash function to information to be certified by the public key certificate of the end entity.

4. A method for as recited in claim 1, further comprising the steps of:
  verifying, by a verifying party, the issuing authority signature with the contents signed by the issuing authority; and
  verifying, by the verifying party, the registration authority signature with the contents signed by the registration authority included in the public key certificate.

5. A method as recited in claim 2, further comprising the steps of:
  acquiring, by a verifying party, information signed by the registration authority according to the identifier in the public key certificate;
  calculating, by the verifying party, a hash value of the acquired information;
  decoding, by the verifying party, the registration authority signature included in the public key certificate, by using a public key of the registration authority; and
  checking by the verifying party, whether the hash value is identical to the decoded value.

6. A method as recited in claim 3, further comprising the steps of:
  calculating, by a verifying party, a hash value of the information signed by the registration authority in the public key certificate;
  decoding, by the verifying party, the registration authority signature included in the public key certificate, by using a public key of the registration authority; and
  checking by the verifying party, whether the hash value is identical to the decoded value.

7. A method as recited in claim 4, further comprising the steps of:
  constructing and verifying, by the verifying party, a path from the certificate authority trusted by the verifying party, up to the public key certificate;
  verifying, by the verifying party, the registration authority signature described in the public key certificate using the public key of the registration authority; and
  constructing and verifying, by the verifying party, a path from the certificate authority trusted by the verifying party up to the public key certificate of the registration authority.

8. A method as recited in claim 7; wherein
  the verifying party obtains the public key certificate of the registration authority from a public key certificate database of the issuing authority according to the registration authority name described on the public key certificate.

9. A method as recited in claim 7; wherein
  the verifying party obtains the public key certificate of the registration authority described in an extended region of the public key certificate to be verified.

10. As method a recited in claim 1, further comprising the steps of:
  sending, by the registration authority, a certificate invalidation request to the issuing authority of the public key certificate of the registration authority;
  receiving, by the issuing authority, the certificate invalidation request; and
  invalidating, by the issuing authority, the public key certificate of the registration authority.

11. A certificate authority to be used in a public key infrastructure including a plurality of end entities comprising:

(A) a registration authority for:
  (A-1) generating a signature to contents to be registered with a public key certificate having its own valid term, of each of the plurality of end entities; and
  (A-2) generating a certificate issuing request including both the contents signed by the registration authority and a signature to the contents signed by the registration authority; and
  (A-3) deleting information, at the registration authority, on the public key certificate having been generated if the valid term has been ended; and
  (A-4) deleting information, at the registration authority, on the public key certificate having been generated in response to a public key certificate invalidation request sent from an issuing authority; and (B) the issuing authority connected to the registration authority through a network for generating, in response to the certificate issuing request, a public key certificate including:
  (B-1) the contents signed by the registration authority;
  (B-2) the signature to the contents signed by the registration authority;
  (B-3) issuing contents to be issued by the issuing authority; and
  (B-4) an issuing authority signature to the contents signed by the registration authority, the signature to the contents signed by the registration authority and the issuing contents issued by the issuing authority, the public key certificate being sent to the registration authority and registered within the registration authority.

12. A method for generating a public key certificate of an end entity by a registration authority and an issuing authority in a public key infrastructure, comprising the steps of:
  generating, by the registration authority, a signature to contents to be registered with a public key certificate having its own valid term, and a certificate issuing request including both the contents signed by the registration authority and a signature to the contents signed by the registration authority;
  sending the certificate issuing request from the registration authority to the issuing authority;
  generating, in response to the certificate issuing request, by the issuing authority, a public key certificate including the contents signed by the registration authority, the signature to the contents signed by the registration authority, issuing contents to be issued by the issuing authority, and an issuing authority signature to the contents signed by the registration authority, the signature to the contents signed by the registration authority and the issuing contents issued by the issuing authority;
  sending the public key certificate from the issuing authority to the registration authority for being registered within the registration authority;
  deleting information, at the registration authority, on the public key certificate having been generated if the valid term has been ended; and
  deleting information, at the registration authority, on the public key certificate having been generated in response to a public key certificate invalidation request sent from the issuing authority.

* * * * *